June 30, 1953 D. S. BOND 2,644,138

FREQUENCY CONTROL SYSTEM

Filed Dec. 9, 1949

INVENTOR
Donald S. Bond
BY Harry Tunick
ATTORNEY

Patented June 30, 1953 2,644,138

UNITED STATES PATENT OFFICE 2,644,138

FREQUENCY CONTROL SYSTEM

Donald S. Bond, Princeton, N. J., assignor to Radio Corporation of America, a corporation of Delaware Application December 9, 1949, Serial No. 132,153

2 Claims. (Cl. 332—19)

This invention relates to frequency control systems, and more particularly to systems for automatically maintaining the frequency of an oscillator exactly equal to that of a reference oscillator. The invention is particularly applicable to the control of oscillators which generate power in the ultra-high frequency or super-high frequency regions, such as klystrons or magnetrons.

Various means have been proposed for the synchronization of two oscillators. In those of the relaxation or multivibrator types a control signal, preferably a pulse of reference frequency, is injected into the circuit of the oscillator to be controlled. The characteristic of these oscillators, whereby a very distorted wave form is generated, is essential to the mechanism of control. This is undesirable where sinusoidal output is required. Likewise, the maximum frequency at which such a relaxation oscillator will function is limited at the present time to a few megacycles per second.

Other means involve the direct introduction of a sinusoidal reference voltage into the circuit of a controlled oscillator, which circuit includes an inductance-capacitance frequency controlling circuit. This means has the disadvantages that a very appreciable amount of power must be derived from the reference oscillator, and that the system does not permit deliberate introduction of phase modulation to compensate for an equivalent amount of phase modulation introduced in some circuit coupled to the output of the controlled oscillator.

Still other means employ electromechanical servo systems for control, but these are limited in application by lack of sensitivity to frequency differences, failure to control the relative phase of the two signals once synchronism has been established, or by apparatus complexity.

In several of the aforementioned types of frequency-control systems, control is not established unless the two oscillators are initially nearly synchronous.

An object of this invention is to devise a novel system for synchronizing an ultra-high frequency or super-high frequency oscillator, such as a magnetron or a klystron, with a reference oscillator.

A further object is to devise an oscillator frequency control system wherein phase modulation can be deliberately introduced to compensate for undesired phase modulation generated in some circuit coupled to the output of the controlled oscillator.

A still further object is to provide a frequency control system for a magnetron type of oscillator, by the action of which the phase relation between the signal from said oscillator and a signal of reference frequency is maintained fixed.

Yet another object is to devise a frequency control system for a controlled oscillator wherein the reference oscillator is frequency modulated, thereby enabling a controlled oscillator of much greater power to be similarly modulated.

The foregoing and other objects will be best understood from the following description of some exemplifications thereof, reference being had to the accompanying drawing, wherein.

The objects of this invention are accomplished, briefly, in the following manner: By means of a balanced phase detector to which are applied, as inputs, the reference oscillator frequency and the controlled oscillator frequency, the output frequency of a controlled oscillator, for example an ultra-high frequency or super-high frequency oscillator, is maintained at exactly the frequency of a reference oscillator and at a fixed and predetermined phase with respect thereto. The reference oscillator may be frequency modulated by a modulating signal, thereby causing the controlled oscillator to be frequency modulated in accordance with such signal. In a modification, a super-high frequency oscillator is modulated and is used as an exciter for a power amplifier, the phase detector and feedback or servo loop being utilized to control the super-high frequency oscillator frequency and at the same time to compensate for spurious phase modulation introduced by the super-high frequency exciter or the power amplifier.

Figures 1, 3:
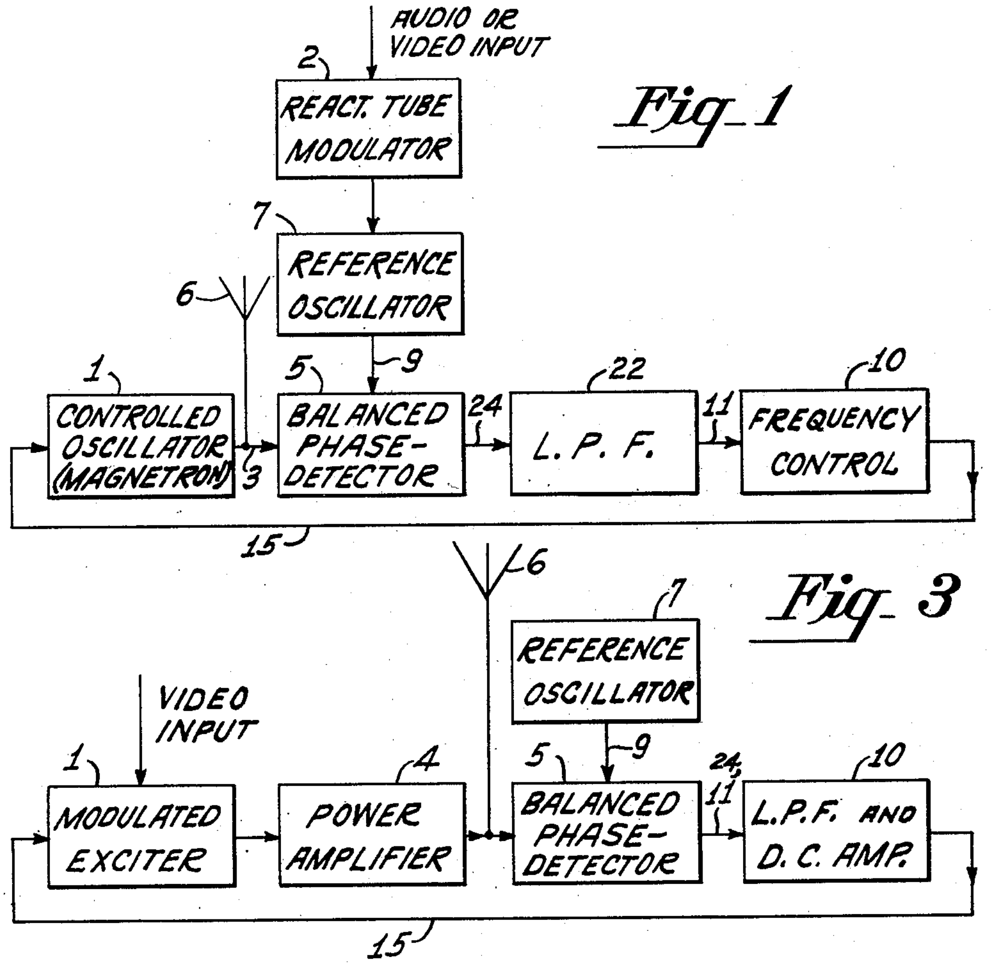
Fig. 1 is a block diagram illustrating a typical mode of operation of this invention.
Fig. 3 is a block diagram illustrating another mode of operation of this invention.

Now referring to Fig. 1, controlled oscillator 1 operating at a mean frequency $f_c$ has a portion of its output applied by path 3 to a balanced phase detector 5. The main portion of the output of oscillator 1 is applied to a suitable transmitting antenna 6 which is coupled to path 3. Reference oscillator 7, operating at a mean frequency $f_r$, has its output similarly applied by path 9 to phase detector 5. Output signals from detector 5 are fed by connection 24 through a low pass filter 22 and thence by path 11 to a frequency control means 10, which in turn is connected by connection 15 to appropriate input terminals of oscillator 1.

Oscillator 1 may be a magnetron, as indicated. As is well-known to those skilled in the art, such a magnetron may consist of a centrally-located cathode surrounded by a plurality of anode segments which form cavity resonators, a magnetic field being provided in a direction substantially normal to the direction of electron flow between cathode and anode segments, thereby exciting the resonators to produce an alternating electric field within said resonators. For frequency control purposes or as a frequency control means, the magnetron may have built thereinto an additional cathode which emits a stream of electrons within one of the cavity resonators, parallel to the main cathode and to the magnetic field. A grid is preferably mounted near this additional cathode, to vary the stream of electrons therefrom, thus varying the frequency of operation of the magnetron, in accordance with the principles disclosed in the copending Smith application, Serial No. 563,732, filed November 16, 1944, now abandoned. The voltage or potential on the grid therefore controls the frequency of operation of the magnetron; such grid is coupled to the aforementioned input terminals of oscillator 1. Therefore, voltages or potentials applied to such input terminals control the ultra-high frequency or super-high frequency magnetron output. In this case, frequency control 10 may be a direct metallic connection or may be a suitable vacuum tube amplifier. In most cases (the magnetron 1 having a rather high nominal output frequency), reference oscillator 7 consists of a suitable crystal oscillator the output of which is passed through frequency multipliers before reaching path 9.

Although the filter unit 22 has been described as being "low pass," it is desired to be made clear that the term "low" is only relative, and that such filter is "low pass" only when referred to the output frequency of oscillator 1. Actually, unit 22 faithfully transmits all frequencies from zero up to a video frequency such as two or three megacycles.

The method of operation of the system of Fig. 1 for automatic frequency and phase control of the mean frequency of oscillator 1 can best be described by assuming first that synchronism has already been established. The inputs to detector 5 from oscillators 1 and 7, while of the same frequency, may have a phase difference $\phi$. The behavior of detector 5 may well be studied by reference to Fig. 2, in which a more or less conventional circuit comprising two rectifiers 17 and 19 is connected to input circuits 8 and 12 of a push-pull and a push-push or single-ended type, respectively. Rectifiers 17 and 19 are illustrative of any suitable rectification devices, such as those of the copper oxide type, vacuum tube diodes, crystal rectifiers, etc. Transformer 13 is assumed ideal so that the voltage $e_2$ across terminals 14 and 20 thereof due to $e_r$ is equal to this latter voltage in magnitude and phase. Then, if $e_2$ and $e_c$ differ in phase by ninety degrees, the direct voltage $e_{out}$ across terminals 16 and 18 will be zero. In a typical case, for other values of $\phi$, voltage $e_{out}$ will vary in magnitude approximately as cos $\phi$.

Thus, referring to Fig. 1 once again, it will be seen that there is no voltage applied by connection 15 to the input terminals of oscillator 1 if oscillators 1 and 7 are in synchronism and their phase difference $\phi$ is ninety degrees. If, now, the phase difference $\phi$ changes from this value, there will be a direct-current output from 5 acting via 22 to cause the frequency control 10 to develop a voltage such as to return the phase of the output of controlled oscillator 1 substantially to its initial value in a manner to be described more in detail hereinafter.

If the phase difference $\phi$ increases with time, there will be the equivalent of a frequency difference between $f_c$ and $f_r$, the controlled and reference frequencies, respectively. The phase detector 5 acts to produce an increasing output at 24 as $\phi$ begins to depart from ninety degrees, and the frequency control means 10 acts to restore the phase of 1 to the value required for stability. For small frequency differences, this analysis shows that the arrangement of Fig. 1 acts to bring the two oscillators 1 and 7 into synchronism, and furthermore (and this is a still more stringent condition) acts to maintain a substantially fixed phase relation between the output voltages of the two oscillators.

If oscillators 1 and 7 are operating at a difference frequency $f_d=f_c-f_r$ when the frequency control means 10 is out of the picture, the output of detector 5 will include a component of frequency $f_d$. The low-pass filter 22 has a cut-off frequency sufficiently high to pass currents of frequency $f_d$ but not those of frequency $f_c$ or $f_r$. With the frequency control means 10 operating normally, the maximum value of $f_d$ at which the system will control so as to bring oscillator 1 into synchronism with 7 is the "maximum lock-in deviation" $f_{max}$. Obviously, $f_{max}$ will not exceed the cut-off frequency of 22, but it may be lower. As previously described, if $f_c=f_r$ but the phase difference is not ninety degrees, there will be a direct voltage $e_{out}$ across the output terminals of the phase detector 5 of a polarity dependent upon the sense of the phase departure from ninety degrees. Such a voltage acts on frequency control means 10 to momentarily so vary the frequency of oscillator 1 as to bring the said phase departure (from ninety degrees) to zero, or in other words, to bring the two frequencies to a relative phase difference of ninety degrees.

Similarly, if $f_c$ does not equal $f_r$, difference frequency or beat frequency components (of frequency $f_d$) are applied to the frequency control means 10 to vary the frequency of oscillator 1 so as to bring the frequency $f_c$ of said oscillator to exactly $f_r$.

Figure 2:
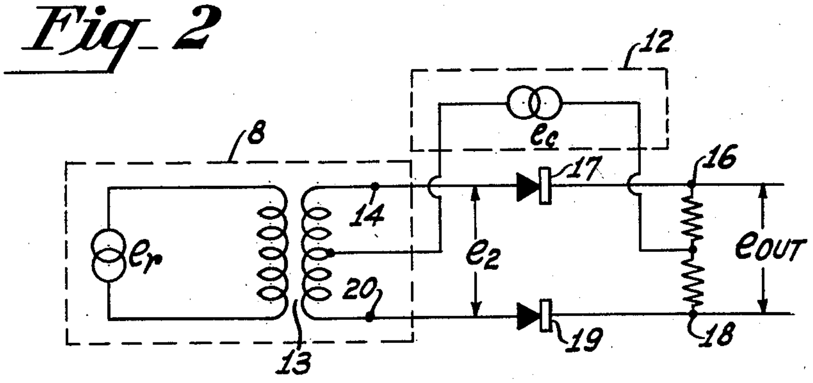
Fig. 2 is a simplified diagram of a balanced phase detector.

Reference is made to Pomeroy Patent 2,288,025, dated June 30, 1942, and to the copending Beard et al. application, Serial No. 56,974, filed October 28, 1948, for a somewhat more detailed explanation of the operation of a phase detector of the type shown in Fig. 2. Said Beard et al. application ripened on February 5, 1952, into Patent #2,584,780.

The frequency control 10 is suitable for the control of the particular type oscillator employed in 1. For example, if oscillator 1 comprises a reflex klystron, a potential (direct or alternating) applied to the repeller electrode thereof will vary the frequency of oscillation. As is well-known, a reflex klystron is an electron discharge device having a cathode and a repeller electrode located on opposite sides of a cavity resonator having apertures therein through which electrons may be projected. Electrons emitted from the cathode travel through the resonator toward the repeller electrode; the potential placed on the repeller causes these electrons to be repelled so that they travel to and fro through the cavity resonator, setting up electromagnetic waves or oscillations therein. The cathode, repeller, and at least that portion of the resonator through which the electrons pass, are mounted in an evacuated envelope. The voltage at 11 of Fig. 1 is of a type suitable for control of an oscillator of this type, so that in this case 10 may consist of a conventional amplifier operating between the frequencies of zero and $f_{max}$, or alternatively, may be entirely omitted.

If, on the other hand, oscillator 1 consists of a conventional triode oscillator employing one or more resonant circuits, unit 10 would become a "reactance-tube" stage of well-known type.

There has been described previously the operation of the system of this invention for maintaining the rest or mean frequency of oscillator 1 exactly equal to that of reference oscillator 7, and at a predetermined phase relation thereto. An audio or video input signal is applied to a reactance tube modulator 2 of more or less conventional type, in order to frequency modulate reference oscillator 7, to which modulator 2 is coupled. By the action of the arrangement of this invention, including phase detector 5, as previously described, controlled oscillator 1 is maintained at all times at a frequency equal to that of reference oscillator 7. Therefore, when oscillator 7 is frequency modulated, the oscillator 1, which may be of much greater power than oscillator 7, is locked-in to oscillator 7, or is caused to be similarly frequency modulated to follow the frequency variations or modulations of oscillator 7.

The apparatus of Fig. 1 may be located at a radio relaying station. When used as a radio relay link, the output is taken from oscillator 1 over path 3 which extends to transmitting antenna 6. The audio or video input to apparatus 2 is then derived from a suitable superheterodyne receiver which receives the incoming frequency modulated radio signal from the remote transmitter and detects the same. This detected signal controls the local oscillator 1 by the action described in the preceding paragraph, causing it to be frequency modulated in accordance with the initial frequency modulation at the transmitting station. At the relaying station, the incoming carrier may be beaten to a new frequency before being applied to modulator 2 of oscillator 7, in case it is desired to operate the controlled oscillator 1 at a mean frequency differing from that of the incoming frequency modulated carrier.

It is within the scope of this invention to use a reflex klystron for the reference oscillator 7, in which case modulator 2 would be omitted, frequency modulation of the klystron being produced by modulation of the klystron repeller voltage. Also, other alternatives are possible.

Now referring to Fig. 3, which represents an embodiment of the invention somewhat similar to Fig. 1 but slightly modified, a magnetron 1, having frequency control means therein as disclosed in the aforementioned Smith application, is amplitude modulated by a video input signal and serves as an exciter for a modulated power amplifier 4, such as a modulated tetrode power amplifier of a television transmitter. The video input signal may be, for example, a television video signal derived from suitable apparatus at the television transmitting station. The output of amplifier 4 is preferably connected to a suitable utilization device, such as a transmitting antenna 6, as well as being coupled to phase detector 5 as one of the inputs thereof. The other connections in Fig. 3 are the same as previously explained in connection with Fig. 1.

Spurious phase modulation may be introduced in either magnetron 1 or power amplifier 4, this modulation being introduced due to the inherent operation of magnetron 1 when it is amplitude modulated, or being introduced in amplifier 4 because of some other effect.

It is desirable to render the output at antenna 6 free of such spurious modulation. This can be effected by the system of this invention, while at the same time effecting control of the mean frequency of exciter 1, by introducing the output signal of amplifier 4 into the phase detector 5 as one of the inputs thereof, in the manner already described. Phase modulation appears at the output of detector 5, and is thereby introduced into the controlled exciter or oscillator 1 itself (due to the circuit action described previously), in such a polarity and magnitude as to neutralize substantially all the spurious modulation introduced into the system. This action is due to the fact that the phase detector 5 produces a direct voltage output whenever the relative phase of oscillator 7 and oscillator 1 is not at the fixed predetermined value; the varying-phase relation or phase modulation therefore produces an effect in such direct voltage output, which effect is applied to controlled oscillator 1 to correct the phase of the output thereof accordingly.

It may be seen, from the foregoing description of this invention, that the improvements in frequency stability herein described are analogous to those found in amplitude modulation amplifiers wherein negative feedback is employed. A study of the present systems will show that herein there is a similar feedback loop, although, of course, the operation is quite different.

What I claim to be my invention is:

1. A modulation system, comprising a controllable modulated exciter, a power amplifier coupled to the output of said exciter, spurious phase modulation being introduced into the signal passing through the exciter and amplifier, a stable reference oscillator, means for mixing the outputs of said amplifier and said oscillator and for producing therefrom voltages responsive to relative phases thereof differing from a predetermined relative phase, and means for applying said produced voltages to said controllable exciter to control the output frequency thereof to substantially neutralize said spurious phase modulation.

2. A modulation system comprising a controllable modulated exciter, voltage-responsive means operative to control the output frequency of said exciter, a power amplifier coupled to the output of said exciter, spurious phase modulation being introduced into the signal passing through the exciter and amplifier, a stable reference oscillator, a balanced detector circuit including a pair of rectifiers, means connecting the output of said oscillator cophasally to said rectifiers, means connecting the output of said amplifier antiphasally to said rectifiers, whereby the outputs of said amplifier and said oscillator are mixed in said circuit to produce in the output thereof voltages responsive to relative phases thereof differing from a predetermined relative phase, and means for applying said produced voltages to said voltage-responsive means to control the output frequency of said controllable exciter to substantially neutralize said spurious phase modulation.

DONALD S. BOND.

References Cited in the file of this patent

UNITED STATES PATENTS

| Number | Name | Date |
|---|---|---|
| 2,289,041 | Roberts | July 7, 1942 |
| 2,377,326 | Crosby | June 5, 1945 |
| 2,455,393 | Varian | Dec. 7, 1948 |
| 2,464,818 | Learned | Mar. 22, 1949 |
| 2,474,278 | Ranger | June 28, 1949 |
| 2,490,007 | Peters | Nov. 29, 1949 |
| 2,567,286 | Hugenholtz | Sept. 11, 1951 |